US009898541B2

(12) United States Patent
Adderly et al.

(10) Patent No.: US 9,898,541 B2
(45) Date of Patent: Feb. 20, 2018

(54) GENERATING DERIVED LINKS

(71) Applicant: International Business Machines Corporation, Armonk, NY (US)

(72) Inventors: Darryl M. Adderly, Morrisville, NC (US); Corville O. Allen, Morrisville, NC (US); Robert K. Tucker, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 14/548,462

(22) Filed: Nov. 20, 2014

(65) Prior Publication Data
US 2016/0147874 A1  May 26, 2016

(51) Int. Cl.
*G06N 5/04* (2006.01)
*G06F 17/30* (2006.01)
*G06F 17/27* (2006.01)
*H04L 12/26* (2006.01)

(52) U.S. Cl.
CPC .... *G06F 17/30882* (2013.01); *G06F 17/2785* (2013.01); *G06F 17/30734* (2013.01); *G06F 17/30976* (2013.01); *G06N 5/04* (2013.01); *H04L 43/062* (2013.01)

(58) Field of Classification Search
CPC ....................................................... G06N 5/04
See application file for complete search history.

(56) References Cited

U.S. PATENT DOCUMENTS

| 7,752,227 | B2 | 7/2010 | Childers et al. |
| 8,589,413 | B1 | 11/2013 | Mohan et al. |
| 2002/0173971 | A1* | 11/2002 | Stirpe ............... G06F 17/30867 705/14.53 |
| 2009/0287678 | A1 | 11/2009 | Brown et al. |
| 2011/0066587 | A1 | 3/2011 | Ferrucci et al. |
| 2011/0125734 | A1 | 5/2011 | Duboue et al. |
| 2011/0142217 | A1 | 6/2011 | Goldfarb |

(Continued)

OTHER PUBLICATIONS

M. De Choudhury et al., "Inferring Relevant Social Networks from Interpersonal Communication", Assoc. Comp. Mach. WWW Conf. 2010, pp. 301-310.*

(Continued)

*Primary Examiner* — Vincent Gonzales
(74) *Attorney, Agent, or Firm* — Stephen J. Walder, Jr.; Diana R. Gerhardt

(57) ABSTRACT

A system, method, computer program product and computer program for evaluating links between objects are provided. A receive ontology component receives an ontology and an identify component identifies, from the ontology, semantic feature types within the ontology that can be used to measure the links between the objects. A data receive component receives instance information and maps the instance information into an ontological form of the instance information. An analyze component analyzes the ontological form to generate an ontological mapping of the instance information. A match component analyzes the mapping to identify matches with semantic patterns. A strength component analyzes the associated semantic features associated with the objects of the matches to determine weightings for the links of the matches. An alert component provides the links and associated weightings.

24 Claims, 12 Drawing Sheets

(56) References Cited

U.S. PATENT DOCUMENTS

| | | |
|---|---|---|
| 2011/0225158 A1 | 9/2011 | Snyder et al. |
| 2011/0251984 A1 | 10/2011 | Nie et al. |
| 2013/0007055 A1 | 1/2013 | Brown et al. |
| 2013/0018652 A1 | 1/2013 | Ferrucci et al. |
| 2013/0066886 A1 | 3/2013 | Bagchi et al. |

OTHER PUBLICATIONS

A. Sheth et al., "Relationships at the Heart of Semantic Web: Modeling, Discovering, and Exploiting Complex Semantic Relationships", in Enhancing the Power of the Internet, (M. Nikravesh et al., eds.), 2004, pp. 63-94.*

"IBM Journal of Research and Development", IBM Corporation, vol. 56, No. 3/4, May/Jul. 2012, 208 pages.

"Pellet: OWL 2 Reasoner for Java", http://clarkparsia.com/pellet, accessed from the Internet on Nov. 19, 2014, 2 pages.

"The OWL Reasoner, Jena OWL rules engine", http://jena.apache.org/documentation/inference/#owl, accessed from the Internet on Nov. 20, 2014, 37 pages.

Domingos, Pedro et al., "Just Add Weights: Markov Logic for the Semantic Web", www.cs.umd.edu/~skok/papers/sw08.pdf, 2008, accessed from the Internet on May 9, 2014, 25 pages.

Ganiz, Murat C. et al., "Link Analysis of Higher-Order Paths in Supervised Learning Datasets", In the Proceedings of the Workshop on Link Analysis, Counterterrorism and Security, 2006 SIAM Conference on Data Mining, http://www.siam.org/meetings/sdm06/workproceed/Link%20Analysis/16Murat_Ganiz_SI_AMLACS.pdf, Apr. 2006, 10 pages.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages.

Marshall, Byron et al., "Using Importance Hooding to Identify Interesting Networks of Criminal Activity", The Journal of the American Society for Information Science and Technology, http://people.oregonstate.edu/~marshaby/Papers/Marshall_JASIST_ImportanceFlooding_PrePrint.pdf, Nov. 2008, 19 pages.

Pioch, Nicholas J. et al., "A Link and Group Analysis Toolkit (LGAT) for Intelligence Analysis", Int'l Conference on Intelligence Analysis, https://www.e-education.psu.edu/drupal6/files/sgam/A%20Link%20and%20Group%20Analysis%20Toolkit%20LGAT%20for%20Intelligence%20Analysis.pdf, May 2005, pp. 1-6.

Seid, Dawit et al., "Semantically Ranked Graph Pattern Queries for Link Analysis", IEEE, http://ieeexplore.ieee.org/xpl/login.jsp?tp=&arnumber=4258714&url=http%3A%2F%2Fieeexplore.ieee.org%2Fxpls%2Fabs_all.jsp%3Farnumber%3D4258714, May 2007, pp. 296-299.

Yuan, Michael J. et al., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

"List of IBM Patents or Patent Applications Treated as Related", 2 pages.

McCord, M.C. et al., "Deep parsing in Watson", IBM J. Res. & Dev. vol. 56 No. 3/4 Paper 3, May/Jul. 2012, pp. 3:1-3:15.

* cited by examiner

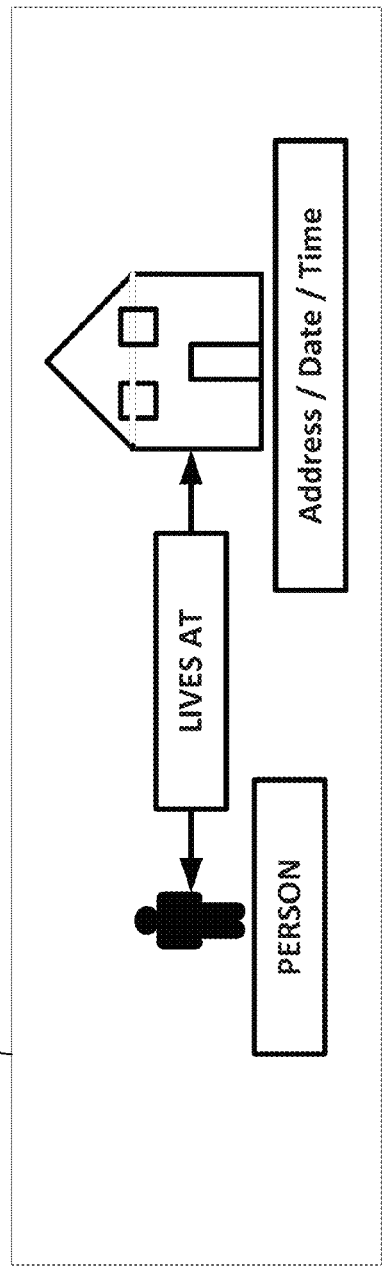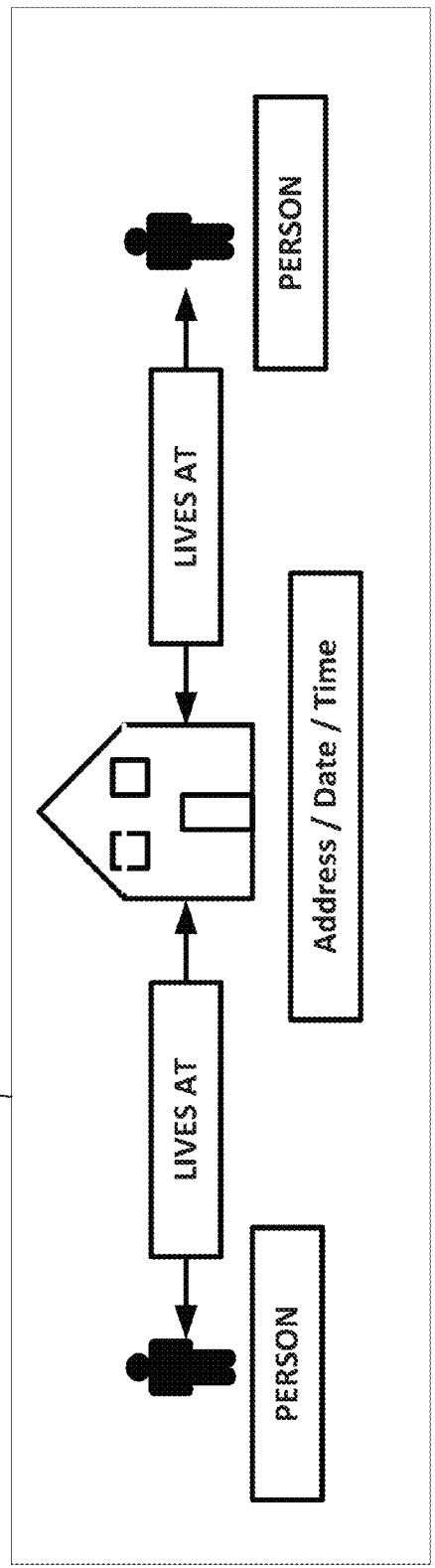
FIGURE 3

| Person | Address | Telephone calls | Organisation | Contact | Strength |
|---|---|---|---|---|---|
| PERSON_A | PLACE_1 | LOG_1 | BUSINESS_1 | PERSON_B | 1 |
| | | | | PERSON_C | 2 |

GENERATING DERIVED LINKS

BACKGROUND

The invention is generally directed to natural language processing. In particular the illustrative embodiments provide a method, computer program product, and system suitable for evaluating links between objects of a semantic model in a natural language processing system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question. QA systems utilize natural language processing techniques to perform their functions with regard to analyzing input questions and analyzing a corpus of information to generate candidate answers to the input questions.

Examples, of QA systems are Siri® from Apple®, Cortana® from Microsoft®, and the IBM Watson™ system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system, is provided for evaluating links between objects. The method comprises receiving an ontology, the ontology comprising object types, associated semantic feature types, and a link between at least two of the object types. The method further comprises identifying, from the ontology, semantic feature types that can be used to measure the links between at least two of the objects and receiving instance information from an information source. Moreover, the method comprises mapping the instance information into an ontological form of the instance information, where the ontological form comprises objects of the at least two object types, and associated semantic features of the semantic feature types. In addition, the method comprises analyzing the ontological form to generate an ontological mapping of the instance information and analyzing the mapping to identify matches with a set of semantic patterns between object types, each semantic pattern being based on the associated semantic feature types of the at least two object types. Furthermore, the method comprises analyzing the associated semantic features associated with the objects of the identified matches to determine weightings for the links of the identified matches and providing the determined weightings associated with the links of the identified matches.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 3 and 4 depict example semantic patterns used by operations in accordance with one illustrative embodiment of the present invention;

FIG. 7 depicts an example learning model which records strengths of links in accordance with one illustrative embodiment of the present invention;

DETAILED DESCRIPTION

Figure 1:
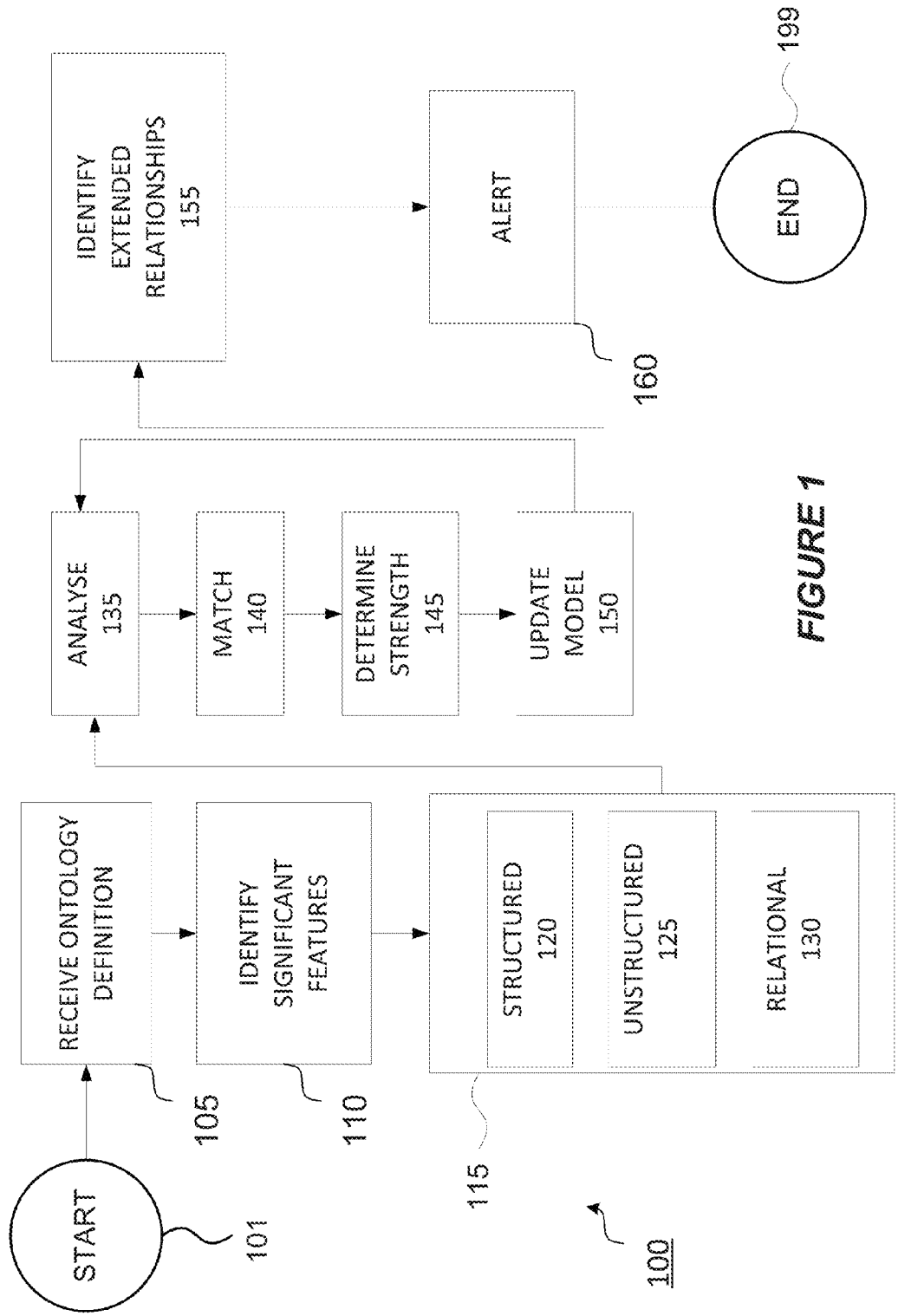
FIG. 1 depicts a high-level example schematic flow diagram depicting operations for identifying links in accordance with one illustrative embodiment of the present invention.

The basis for many intelligence analysis tasks centers around identifying and evaluating derived links between concepts such as people, places, events and property described in an ontology that are not explicitly or directly stated in information. An ontology is an explicit formal specification of the representation of the objects, concepts, and other entities that can exist in some area of interest and the relationships among them. The human analyst attempts to identify derived links using an accumulation of information and making inferences from it.

For example, a hypothesis is made that Person A and Person B know each other. There is no information that states this explicitly, however an amount of corroborating information might exist, e.g., Person A and Person B might work in the same organization. Factors that can influence the strength of evidence include: a size of the organization and its geographic distribution; how long Person A and Person B have been working together; what their relative organizational roles are; whether they have ever communicated; whether they live in the same area; and whether they share common friends.

For an analyst, finding new, credible links is a major challenge, especially across large and complex data sets. It is very difficult for the analyst to identify relevant links where the links are not explicitly or directly stated in the information. It is also very difficult to identify which links are likely to be most relevant, out of all potential derived links in information.

Many examples of this process of finding links between disparate data sets can be seen in Law Enforcement (e.g. crime analysis), Commercial Security (e.g. fraud, anti-money laundering analysis), Military (e.g. target analysis) and National Security, and the like. An example of disparate data sets being used includes the use by car manufacturers, when designing vehicle shapes, of marine life shapes as well as information from existing car shapes.

A similar problem faces computer network analysts. Analysts need to identify network components that have most influence on each other, in order to design redundancy into the network. Conversely, failure analyst need to identify which upstream or downstream components have most influence on a component that has suffered a failure, in order to identify possible causes of that failure.

The present invention will be described in further detail with reference to a specific illustrative embodiment of the invention as used to provide connection information based on available information, much in digital form. However, in many cases, the information is unstructured and the amount of information related to a single person can easily range in the hundreds of megabytes.

Retrieving the most important data items from a system is difficult for a number of reasons. Systems, which contain multiple sensors and digital sources, are typically very large, so collating summary information by hand can be extremely difficult. Furthermore, queries prepared in a semantic information retrieval language and run against a semantic database are dependent on formulating effective queries, which is not trivial.

Natural language processing of the system may use an ontology language, for example an ontology language from the Web Ontology Language (OWL) family of data representation languages. These languages are used for creating ontologies. The languages use formal semantics to represent information. String matching may include an Indri search query built with the input question or search terms and run against the index or a structured data search string match within structured data fields. For example, Structured Term Recognition (STR) may recognize new terms of a specific type based on the structure of known terms for that type, e.g. "mobile phonecall" is a term and is a type of "phonecall".

Herein a description is provided with reference to the use of the IBM Watson™ Question and Answer (QA) architecture in which illustrative embodiments the present invention may be implemented. The QA system (e.g., IBM Watson™ QA System) conducts a primary content specific search within a suitable corpus for candidate answers and associated relevant notes, snippets, terms, and structured data. Once the search results are returned, the retrieved results are scored on a variety of measures of semantic match, relationship strength, and other criteria.

Candidate responses may be scored based on suitable knowledge from suitable corpora, including books, web pages, and other text-based knowledge representations. A score may be determined for the candidate responses based on the degree of semantic match of the passages to the data relationship questions. Another score may be determined for the candidate responses based on the strength of relationship of the passages to the data relationship questions.

Answers are obtained from the QA system based on the highest scoring candidate responses. After the answers and corresponding scores are obtained, the answers are analyzed in order to identify and record relationships between the concepts.

Advantageously, illustrative embodiments of the present invention perform operations to receive structured and unstructured information about objects/concepts (e.g., people, phone calls, companies they work for, houses they live in etc., or network devices, network connections, Quality of Service metrics, Internet Protocols (IP) addresses, types of device, manufacturer etc.), and then analyze the links between them based on all available evidence in the information, using a machine learning model applying weights to the relationships to derive a further set of relationships (links), between the objects and concepts.

For example, consider the following example input objects, links, and resulting evidential patterns:

Input objects (designated by "<< . . . >>"): <<John>>, <<Paul>>, <<Mary>>, <<Fred>>, <<Acme>>;

Links (designated by "< . . . >"): <phones> <works for> <is married to>;

Evidence leads to patterns (designated by Object-link-Object):

<<John>> <phones> <<Paul>>

<<Paul>> <works for> <<Acme>>

<<Mary>> <works for> <<Acme>>

<<Acme>> has 5 employees

<<Mary>> <is married to> <<Fred>>

Advantageously, illustrative embodiments of the present invention use machine learning to analyze features of objects and strengths of links. For example, the links <phones>, <works for>, and <is married to>, may be analyzed to conclude or generate a new derived link <knows> and an output pattern of:

Output: <<John>> <knows> <<Fred>>

Advantageously, in the case of the example of input objects representing people, illustrative embodiments of the present invention automatically generate links between people using evidence from information about them, for example, about telephone calls, places of work, and where they live. The illustrative embodiments also automatically generate links between computer systems using evidence from information about them, for example, about alerts, specifications, and connections. The term "link" is used herein to represent a link, relationship or association.

An example of a machine learning model is the IBM Watson™ QA system, or instances of the IBM Watson™ system, developed by IBM and described with greater detail in the IBM Journal of Research and Development, Volume 56, Number 3/4, May/July 2012, the contents of which are hereby incorporated by reference in its entirety. IBM is a trademark of International Business Machines Corporation of Armonk, N.Y. and is registered in many jurisdictions worldwide.

Viewed from a first aspect, the illustrative embodiments provide a system for evaluating links between objects, comprising a receive ontology component for receiving an ontology, the ontology comprising object types, associated semantic feature types, and a link between at least two of the object types, each semantic pattern based on the associated semantic feature types of the at least two object types; an identify component for identifying, from the ontology, semantic feature types that can be used to measure the links between at least two of the objects. The system further comprises a data receive component for receiving instance information from an information source with the data receive component being further operable for mapping the instance information into an ontological form of the instance information. The ontological form comprises objects of at least two object types and associated semantic features of the semantic feature types. The system further comprises an analyze component for analyzing the ontological form to generate an ontological mapping of the instance information and a match component for analyzing the mapping to identify matches with a set of semantic patterns between object types. Each semantic pattern is based on the associated semantic feature types of the at least two object types. The system also comprises a strength component for analyzing the associated semantic features associated with the objects of the identified matches to determine weightings for the links of the identified matches and an alert component for providing the determined weightings associated with the links of the identified matches.

In some illustrative embodiments the system further comprises an extend component for establishing at least one new link between two objects of the ontological form. The at least one new link is established between two objects that had not been identified as being linked before.

In some illustrative embodiments, the strength component is operable for analyzing the links using machine learning techniques of a question-answering (QA) system. In some illustrative embodiments, the strength component is operable for analyzing the associated semantic features with a learning model to determine the weightings for the links, and the learning model comprises a set of relative levels for occurrences of data instances based on a domain of the ontology and a set of relative levels associated with the associated semantic features.

In some illustrative embodiments, the instance information comprises at least one of structured information, unstructured information, and relational source information. In some illustrative embodiments, the alert component is operable for providing the links and determined weightings as a ranked list. Moreover, in some illustrative embodiments, the alert component is further operable for detecting that one or more determined weightings has reached a predetermined threshold and, responsive to reaching the predetermined threshold, to provide the links and the determined weightings.

In some illustrative embodiments, the ontology further comprises the set of semantic patterns and the identify component is further operable for identifying the set of semantic patterns from the ontology.

In some illustrative embodiments, a learn component is provided in the system for updating the determined weightings to the learning model. Furthermore, in some illustrative embodiments, the learning model uses associative data, at least one of social media, and electoral roles, for the strength component to determine the determined weighting to a link.

In some illustrative embodiments, the learning model uses communications data between two objects, including at least one of a telephone call, email, Instant Messaging, social media post, and weblog, for the strength component to determine the determined weighting to a link. In some illustrative embodiments, the learning model uses financial data transaction data, including at least one of banking logs, investment logs, and purchase history, for the strength component to determine the determined weighting to a link. Moreover, in some illustrative embodiments, the learning model uses event data, including at least one of sightings, travel logs, geo-location, and place characteristics, for the strength component to determine the determined weighting to a link, the place characteristics comprising at least one of type of occupancy, period of occupancy, location, entry and exit patterns.

Viewed from a further aspect, the present invention provides a method for evaluating links between objects, comprising the operations: receiving an ontology, the ontology comprising object types, associated semantic feature types, and a link between at least two of the object types; identifying, from the ontology, semantic feature types that can be used to measure the links between at least two of the objects; receiving instance information from an information source; mapping the instance information into an ontological form of the instance information, wherein the ontological form comprise objects of the at least two object types, and associated semantic features of the semantic feature types; analyzing the ontological form to generate an ontological mapping of the instance information; analyzing the mapping to identify matches with a set of semantic patterns between object types, each semantic pattern based on the associated semantic feature types of the at least two object types; analyzing the associated semantic features associated with the objects of the identified matches to determine weightings for the links of the identified matches; and providing the determined weightings associated with the links of the identified matches.

In some illustrative embodiments the operations further comprise establishing at least one new link between two objects of the ontological form. Furthermore, in some illustrative embodiments the operations further comprise analyzing the links using machine learning techniques of a question-answering (QA) system.

In some illustrative embodiments the operations further comprise analyzing the associated semantic features with a learning model to determine the weightings for the links. The learning model may comprise a set of relative levels for occurrences of data instances based on a domain of the ontology and a set of relative levels associated with the associated semantic features. In some illustrative embodiments, the instance information comprises at least one of structured information, unstructured information, and relational source information.

In some illustrative embodiments, the operations further comprise providing the links and determined weightings as a ranked list. In some illustrative embodiments the operations further comprise detecting that one or more determined weightings has reached a predetermined threshold and, in response to reaching the predetermined threshold, providing the links and the determined weightings.

In some illustrative embodiments, the ontology further comprises the set of semantic patterns, the method further comprising a operation of identifying the set of semantic patterns from the ontology. In some illustrative embodiments, the operations further comprise updating the determined weightings of the learning model.

Moreover, in some illustrative embodiments, the learning model uses communications data between two objects, including at least one of a telephone call, email, Instant Messaging, social media post, and weblog, for the method to determine the determined weighting to a link. In some illustrative embodiments the learning model uses financial data transaction data, including at least one of banking logs, investment logs, and purchase history, for the method to determine the determined weighting to a link. In some illustrative embodiments the learning model uses event data, including at least one of sightings, travel logs, geo-location, and place characteristics, for the method to determine the determined weighting to a link, the place characteristics comprising at least one of type of occupancy, period of occupancy, location, entry and exit patterns. Furthermore, in some illustrative embodiments the learning model uses associative data, at least one of social media, and electoral roles, for the method to determine the determined weighting to a link.

Viewed from a further aspect, the illustrative embodiments provide a computer program product for evaluating links between objects, the computer program product comprising a computer readable storage medium readable by a processing circuit and storing instructions for execution by the processing circuit for performing a method for performing the various operations set forth herein. Viewed from a further aspect, the illustrative embodiments provide a computer program stored on a computer readable medium and loadable into the internal memory of a digital computer, comprising software code portions, when the program is run on a computer, for performing the operations set forth herein. Viewed from still a further aspect, the illustrative embodiments provide a system and method substantially as described with reference to the figures.

The illustrative embodiments provide a machine learning based mechanism that automatically generates derived links between information concepts, thereby accelerating the intelligence analysis process as well as increasing the level of hypothesis induction within the intelligence. The invention uses semantic pattern matching to identify semantically significant links in information, along with a machine learning model that uses semantic features (e.g. telephone type) to measure the strength of inferred links, e.g., John is linked to Acme Company by semantic pattern of "John is an employee of Acme". The illustrative embodiments expedite task resolution by providing derived links, and also identifying meaningful links/associations/relationships within unstructured data. The illustrative embodiments derive links between concepts with a defined importance based on deep semantic characteristics of the evidence and how the evidence set influences link importance in an intelligence analysis between concepts. The illustrative embodiments span across a set of concepts, relationships and the features to determine weightings across the set, rather than single weights between features. Thus, the illustrative embodiments allow reasoning to be made on, for example:

whether Person A knows Person B, and what level the relationship is, for example, personal, professional or just mere acquaintance.

how likely Person A is to perform or participate in Event Y.

how likely Person A is to be in Place Z at a given time period.

Figure 2:
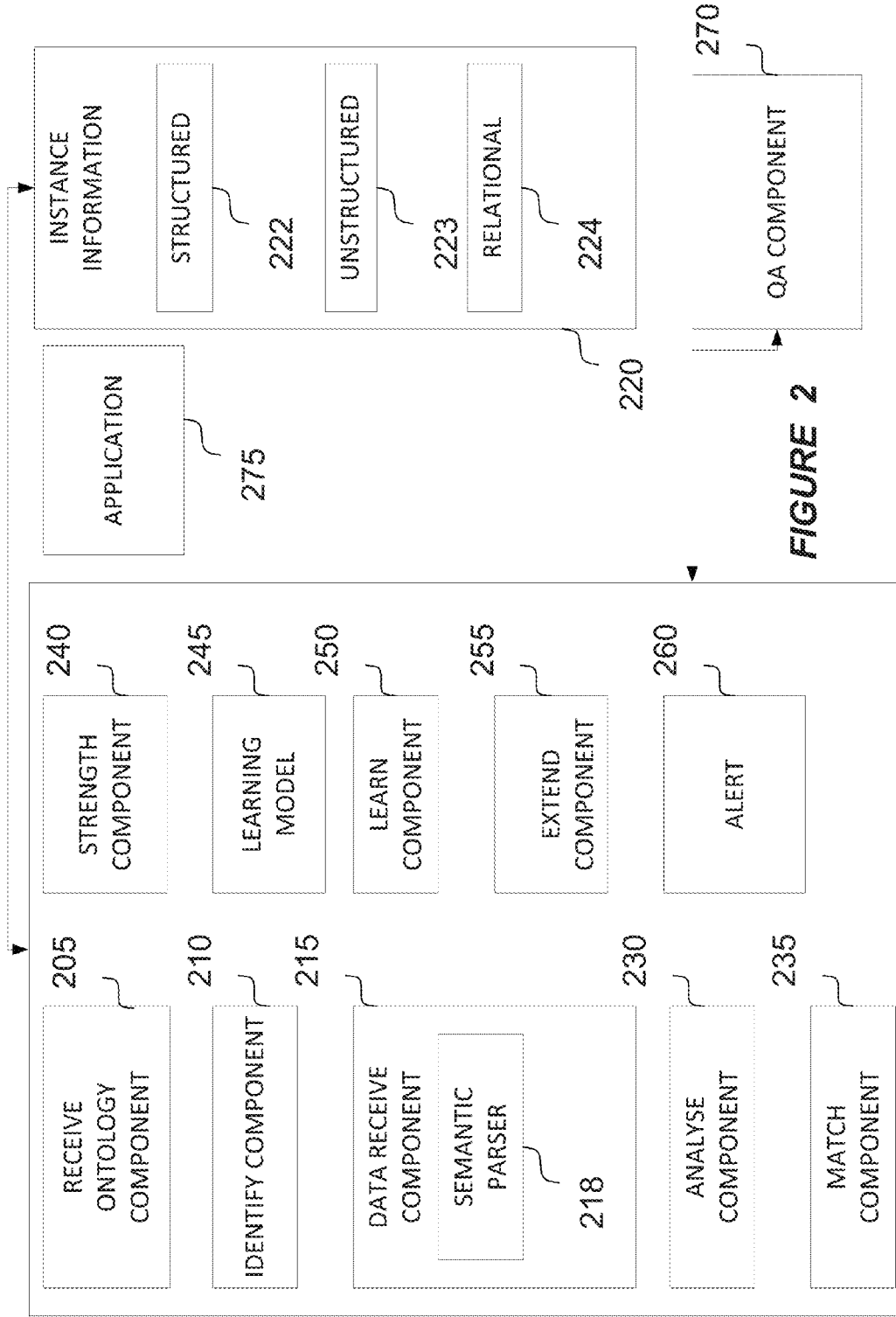
FIG. 2 depicts an example system that implements operations in accordance with one illustrative embodiment of the present invention.
Figure 4:
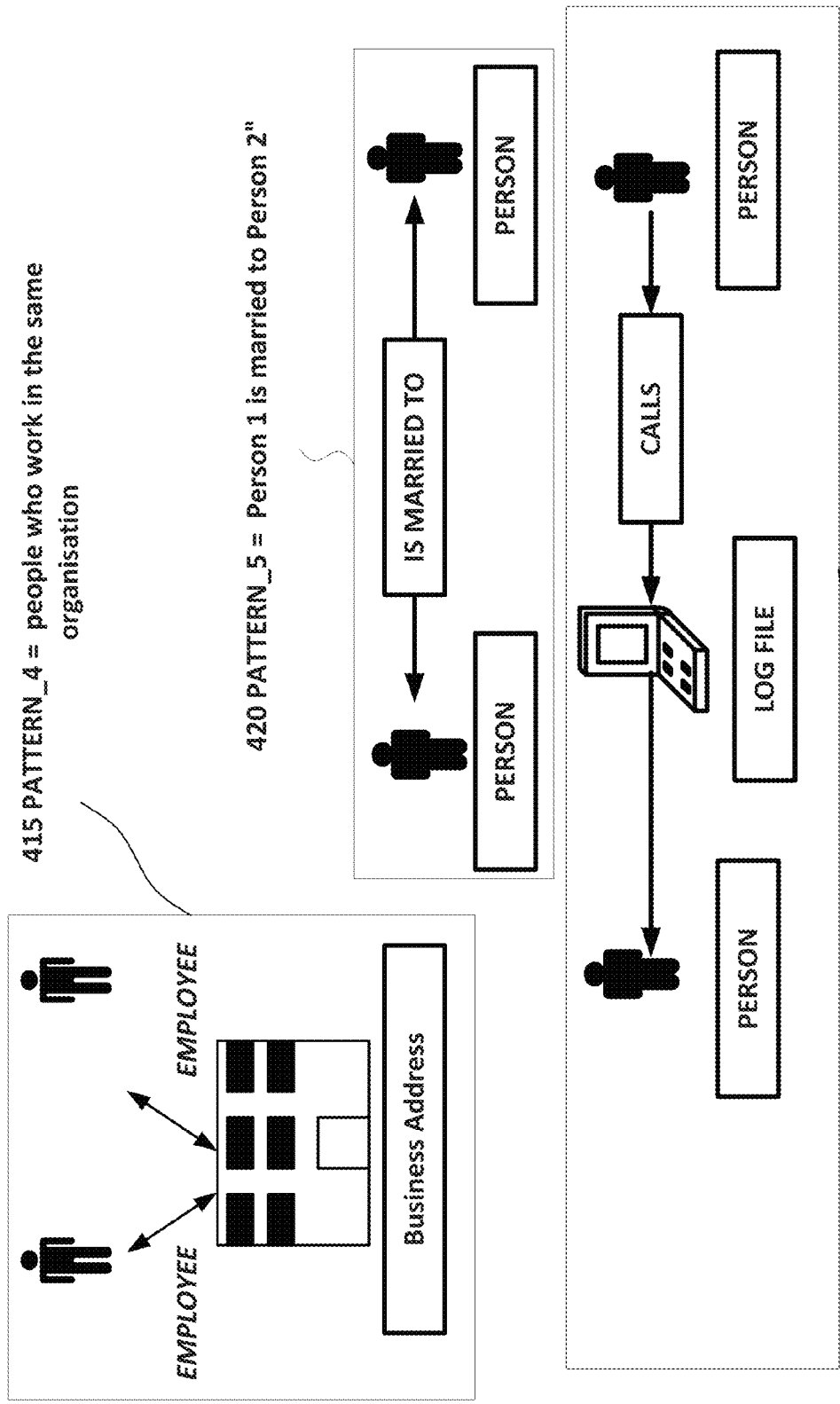
Figure 5:
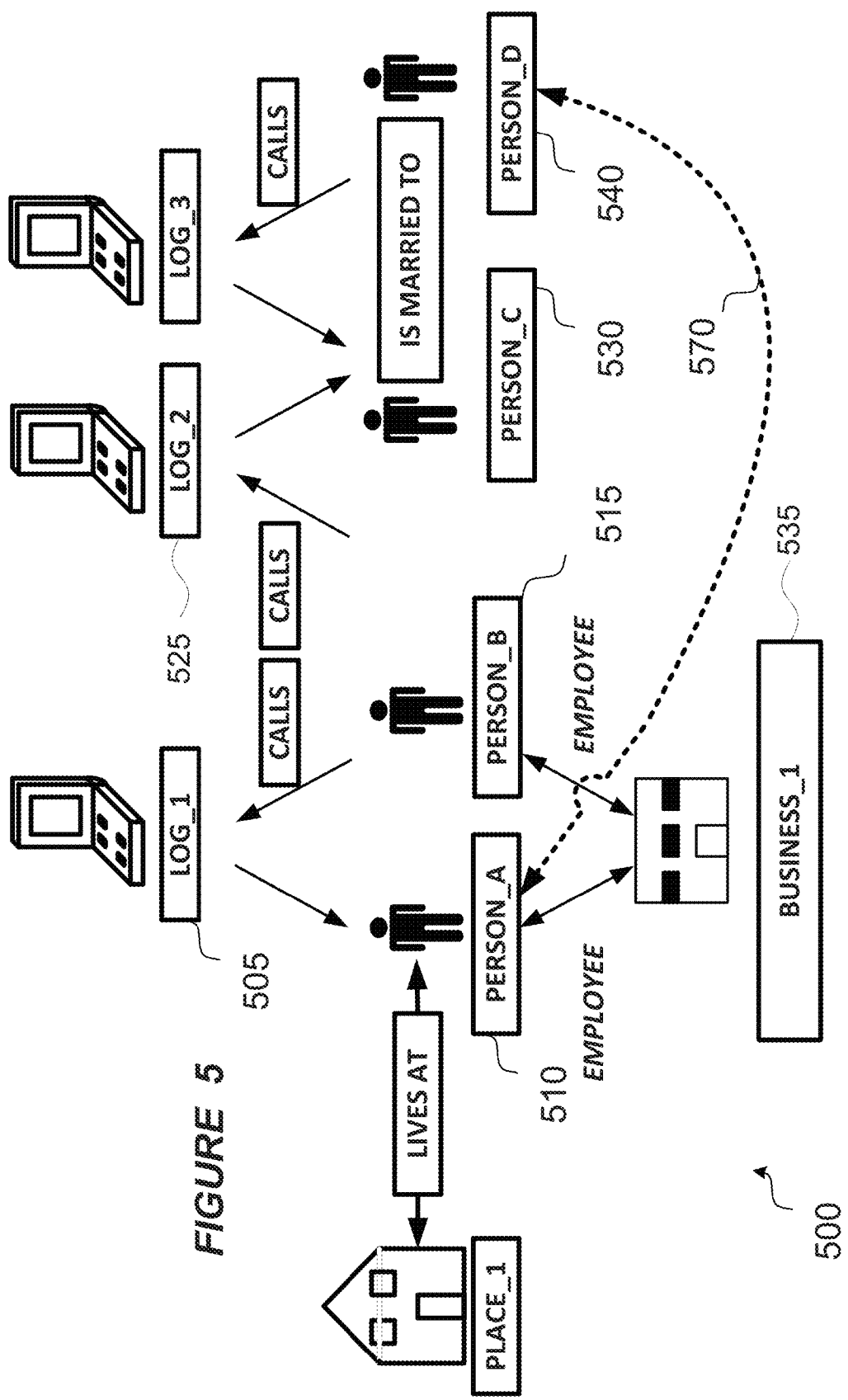
FIG. 5 depicts example instance information as mapped into ontological form in accordance with one illustrative embodiment of the present invention.
Figure 6:
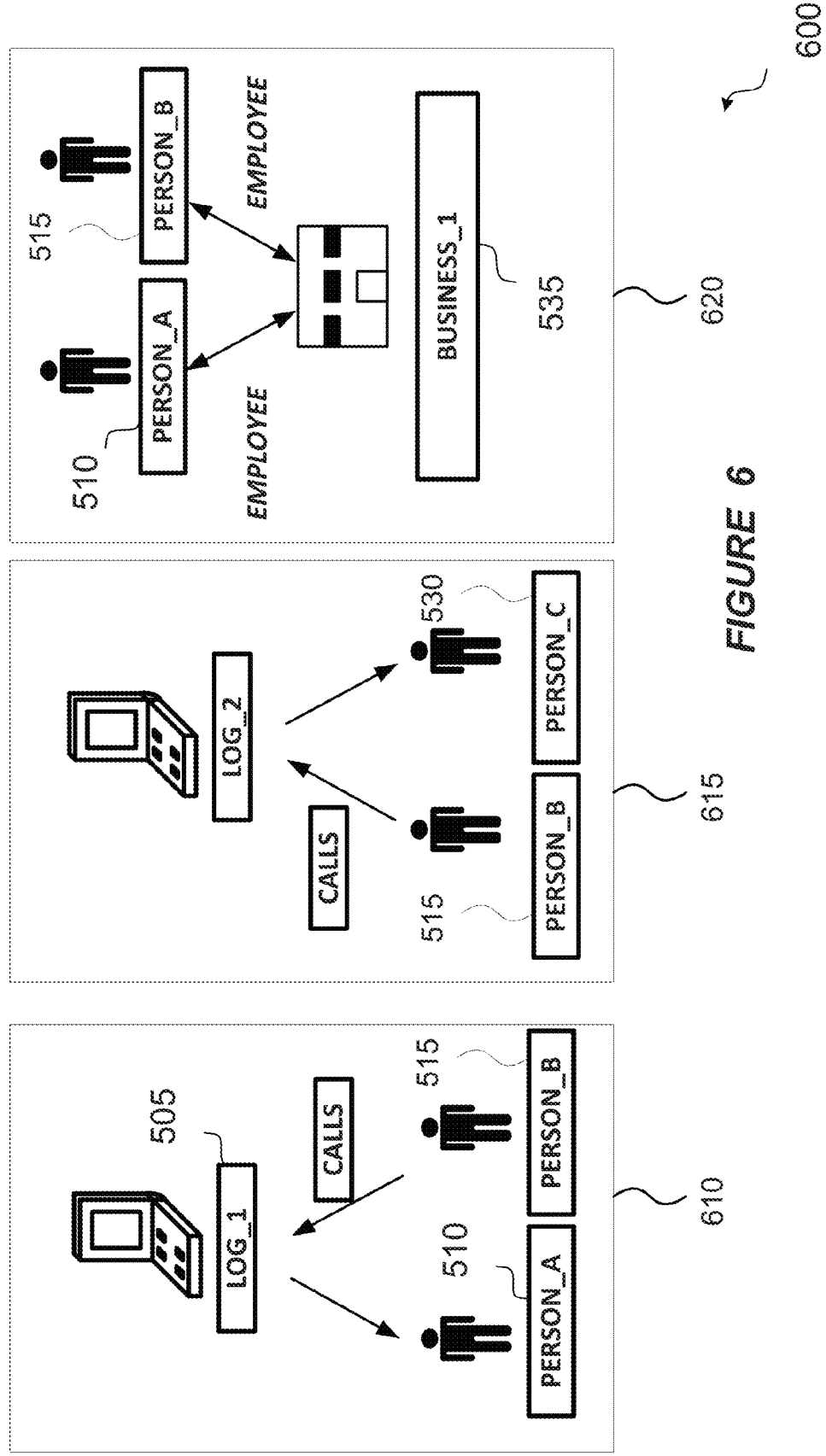
FIG. 6 depicts an example operation of matching of ontologically mapped exemplary instance information instances with semantic patterns in accordance with one illustrative embodiment of the present invention.

FIG. 1, which should be read in conjunction with FIGS. 2 to 7, is a high-level example schematic flow diagram depicting operations 100 for identifying links in accordance with one illustrative embodiment of the present invention. FIG. 2 depicts an example determination system 200 used by the operations 100, as well as example instance information 220. FIGS. 3 and 4 depict example semantic patterns 305, 310, 410, 415, 420. FIG. 5 depicts the example instance information 220 as mapped into ontological form by the determination system 200. FIG. 6 depicts an example of the matching of ontologically mapped example instance information instances 610, 615, 620 with semantic patterns 305, 310, 410, 415, 420. FIG. 7 depicts an example learning model 245 which records strengths of links.

As shown in FIG. 1, following the start operation 101, at operation 105, the receive ontology component 205 of the determination system 200 receives an ontology, where the ontology defines a domain and the domain comprises object types, and associated semantic feature types, and a set of semantic patterns between object types with each of the semantic patterns comprising at least two object types and a link between the at least two object types. Each of the semantic patterns are based on the associated semantic feature types of the at least two object types corresponding to the semantic pattern. In one illustrative embodiment, the ontology is defined by a domain expert using an ontology definition language such as RDFS, OWL, or the IBM i2 Entity, Link, Property (ELP) model. In an alternative embodiment the ontology is received from a corpus of information, where the corpus is defined by the domain expert, or by machine learning automatic updates to a primitive corpus or set of corpora. Such an ontology creation may need to be updated for specific domains.

For example, let a set of object types include People, Addresses, Organizations, and Phone calls. Each object type has a number of associated semantic feature types (otherwise known as parameters), for example, but not restricted to:

People: name, age, gender

Address: number, road, town, date, period of occupancy, type of occupancy (flat, house hotel), people Organization: name, address, type of business time period at work, size of organization, geographic distribution of offices, role within organization, people.

Telephone call: call date, type, direction, telephone type (work, home) and level of use, people.

Home Address: period of occupancy, type of occupancy (flat, house hotel)

People are associated with Addresses, Telephone Calls and Organizations as well as to each other with a given strength (e.g., Friend, Colleague, Acquaintance). If two object types share the same value of semantic feature type, the two object types are associated with each other by a link. For example, if Person_A 510 and Person_B 515 share the same employer, they are associated by a link <works at the same employer as>, to define a semantic pattern of "<<Person_A 510>><works at the same employer as> <<Person_B 515>>".

An example of an ontology is depicted in FIGS. 3 and 4, which depict example semantic patterns. In FIGS. 3 and 4, the semantic patterns include Pattern_1 305, of the address of a person, depicts a semantic pattern of <<Person>> <lives at> <<Address, at date, at time>>. And Pattern_2 310, of people who live at the same address, depicts a semantic pattern of <<Person 1 . . . n>> <lives at> <<Address, at date, at time>>.

Semantic patterns can be related, for example, based on a commonality of two objects. For example, if two matches for Pattern_1 305 are identified with different people but a common address/date/time, then Pattern_2 310 can be inferred. During data matching later in the operation of the illustrative embodiments, further information can be extracted by using the relationships between patterns. For example: "Person A lives at Address 1, on May 1, 2014" and "Persons B and C live at the same address of Address 1, on May 1, 2014" implies that "Persons A, B and C live at the same address of Address 1, on May 1, 2014".

Similarly, Pattern_3 410, of people who call each other, depicts a semantic pattern of <<Person 1>> <calls> <<Person 2>>. Pattern_4 415, of people who work in the same organization, depicts a semantic pattern of <<Person 1 . . . n>> <is employee of> <<Organization, size>>. Pattern_5 420, of people who are explicitly associated, depicts a semantic pattern of <<Person 1>> <is married to><<Person 2>>, or <<Person 1>> <is a business associate of><<Person 2 . . . n>>.

It is evident, to those of ordinary skill in the art, that numerous semantic patterns could be established in numerous forms. Some semantic patterns are one-to-one mappings, for example <<Person 1>> <is married to> <<Person 2>>. Other semantic patterns are one-to-many, for example, <<Person 1>> <is a business associate of> <<Person 2, 3 . . . m>>. Other semantic patterns are many-to-one. Other semantic patterns are many-to-many. The number and complexity of semantic patterns will vary according to the depth of analysis the analyst requires.

At operation 110, an identify component 210 of the determination system 200 identifies, from the ontology, semantic feature types, subsets of the available semantic features, within the ontology that can be used to measure weightings for the links. These could be considered as "strength" weightings of the link. For example, People: age
Telephone call: call date, type, direction, telephone type (work, home) and level of use.
Home Address: period of occupancy, type of occupancy (flat, house hotel)
Work organization: time period at work, size of organization, geographic distribution of offices. Comparative roles within organization. For roles, a taxonomy can be used to determine similarity. Also, specific rules that associate roles can be employed (e.g., Personal Assistants and CEOs tend to work closely together).

In an alternative embodiment, at operation 105, the receive ontology component 205 of the determination system 200 receives an ontology with the ontology defining a domain, and the domain comprising object types and associated semantic feature types. At operation 110, an identify component 210 of the determination system 200 also identifies from the ontology semantic features, subsets of the available semantic features within the ontology that can be used to measure weightings for the links. At operation 110, the identify component 210 of the determination system 200 further identifies a set of semantic patterns between object types with each semantic pattern comprising at least two object types and a link between the at least two object types and the semantic pattern being based on the associated semantic feature types of the at least two object types.

In one illustrative embodiment, at operation 115, a data receive component 215 of the determination system 200 receives a dataset 220 from an information source with the dataset 220 containing instance information 220. The data receive component 215 extracts the instance information 220 into an ontological form. The ontological form comprises objects of the object types and associated semantic features of the semantic feature types. "Instance information" as used herewithin represents information concerning a particular instance under consideration by the system. An information source can provide numerous types of information, such as structured information, unstructured information and relational sources.

At operation 120, structured information 222 is extracted, transformed and loaded into a domain ontology form that expresses the concepts and relations between them. Structured data is data that resides in a fixed field within a record or file. The term can also refer to data in relational databases and spreadsheets. For example, Log_1 505 is semantically parsed to identify that Person_B 515 calls Person_A 510 at 9 pm. A semantic parser 218 of the data receive component 215 can map a natural language sentence into a formal meaning, and can extend to representing the sentence in predicate form. The semantic parser pulls further information on the concepts, link and type of data. Evidence is associated with the telephone call including time, number used, type of device, and length of call. A call time during working hours may provide some evidence that Person_B 515 and Person_A 510 have a professional link, whereas a time outside working hours may provide some evidence that Person_B 515 and Person_A 510 have a personal link. Such evidence may be backed up by further instances of interaction.

At operation 125 unstructured sources 223 have key concepts and relations extracted using a suitable text extraction method. Unstructured data does not have a pre-defined data model. Unstructured information may contain text, numerical data and facts.

At operation 130, relational sources 224 are also mapped into the ontological form. A relational data source is a database in which information is stored in a number of database tables.

Instance information is created that conforms to the ontology. Using the semantic patterns, the illustrative embodiments may automatically identify matches in the instance information. A semantic query language can be used to achieve this automatic identification of matches in the instance information (e.g., SPARQL).

At operation 135, an analyze component 230 analyzes the ontological form to build up or generate an ontological mapping 500 of the instance information as depicted in FIG. 5, for example. At operation 140, a match component 235 of the determination system 200 further analyzes the mapping 500 to identify matches with the semantic patterns 305, 310, 410, 415, 420. In the example, matching instance 610 is identified as matching Pattern_3 410, matching instance 615 is also identified as matching Pattern_3 410, and matching instance 620 is identified as matching Pattern_4 415. Other patterns may also be identified by the instances.

At operation 145, a strength component 240 of the determination system 200 analyzes the associated semantic features associated with the objects of the matches to determine weightings for the links of the matches 410, 415, 420, to determine strengths of the links. In this example, the relevant objects in matching instances 410, 415, 420 are: Person_A 510, Log_1 505, Person_B 515, Log_2 525, Person_C 530, and Business_1 535.

The semantic features within the matching instances 410, 415, 420 are used to determine the strength of the corresponding link. Using machine learning techniques of a question-answering (QA) system 270, evidence in the data can be used to determine specific strength of matching instances 410, 415, 420. Evidence can take the form of an occurrence of data instances. For example, Person_A 510 and Person_B 515 have numerous phone calls during the working day. Person_A 510 and Person_B 515 also both work for Business_1 535. Therefore, there is evidence to derive an inference that "Person_A is a professional associate of Person_B". The strength component 240 uses the significant semantic features identified in operation 110 to measure the link strength. For example, for the case of matching instance 140, the strength component 240 analyzes the significant semantic features of Person_A(age), of Log_1(call date), and Person_B(gender) to measure the link strength of the link "Calls" 520. The link strength of "Calls" 520 may be then applied to a number of instances of "Calls" (e.g., between other Persons), or the link strength may be applied only to telephone calls between Person_A 510 and Person_B 515. The strength component 240 and the QA system 270 uses a learning model 245 to determine strengths. The QA system 270 is depicted as being external to the system 200, but in an alternative embodiment is part of the system 200.

The learning model 245 is developed such that the learning model 245 designates a set of importance levels for the evidence characteristics based on the entity/concepts involved. The learning model 245 for a communication, specifically a telephone call, includes, time of call, type, duration, frequency, caller, callee, concept relationship. This is used to learn, based on the feature set, how important the "telephone call" link between the concepts should be treated in an analysis. Based on a learned pattern, the link will be given an importance level and, if over a threshold, the link will be included in the analysis and the entities/concepts and the relationship will be surfaced to the analyst. FIG. 7 depicts the learning model 245, which can take the form of a table that keeps a record of the objects, the links with each other, and relative strengths of the links.

Generation of the learning model 245 comprises operations to collect all the evidence features mentioned above across multiple domains and create routes based on the feature types to importance levels by a domain expert, certain key terms and their characteristics primarily governed by the incoming concepts and link type will be used to determine a learned approach for importance. Linear regression (multivariate) or logistic regression can be used due to the large feature sets to find a fitting function that gives a reasonable accuracy for the learning model 245 that fits the importance level during training that is expected.

In some illustrative embodiments, the strength component 240 of the determination system 200 uses a list of entities of interest related to the case information, creates questions based on the list of entities of interest, enters the created questions into a question and answer (QA) system 270 using an unstructured domain corpus, extracts case information summary entities based the answers to those questions, displays the list of entities of interest along with the case information summary entities, and indicates relationships between the entities of interest and the summary entities. The QA system 270 can be any QA system 270 capable of producing concise answers to given questions. However, the case summaries will vary in content and/or quality depending on the QA system 270 used. One illustrative QA system 270 is the IBM Watson™ QA system, or instances of the IBM Watson™ QA system, developed by IBM and described with greater detail in the IBM Journal of Research and Development, Volume 56, Number 3/4, May/July 2012, the contents of which are hereby incorporated by reference in its entirety. IBM is a trademark of International Business Machines Corporation of Armonk, N.Y. and is registered in many jurisdictions worldwide.

At operation 150, a learn component 250 of the determination system 200 updates the weightings identified in operation 145 to the learning model 245, so that the learning model 245 is up to date with the new weightings for input into the method operations of FIG. 1. At operation 155, an extend component 255 applies the learning of operation 150 to further establish a derived link 570. The derived link 570 can also be derived through further degrees of separation. For example: Person_B 515 has a phone call with Person_C 530 outside working hours; and Person_C 530 is strongly associated with Person_D 540, both as they are married to each other and as they call each other. Therefore, a phone call between Person_C 530 and Person_B 515 may be good evidence that there is a link between Person_D 540 and Person_B 515. Wherever a link is inferred from the semantic patterns, a derived link 570 is created with the strength weighting. The learn component 250 may then update the learning model 245 with the derived link 570.

At operation 160, an alert component 260 of the determination system 200 provides the weightings of the links as results to an analysis application 275, such as IBM i2® Analyst's Notebook®, with a ranked list of derived links 570 to help prioritize which links to follow up on. In an alternative embodiment, a newly derived link 570 can result in an electronic alert that could trigger an alarm in a security system, e.g., to alert border staff that an associate of another known person has just arrived at an airport. The process then ends with operation 199.

A "link" in one illustrative embodiment may be represented as an electronic message comprising data representing the nature of the link, a weighting of the link, details of the objects involved, ontological representation of the link, and other parameters.

Figure 8:
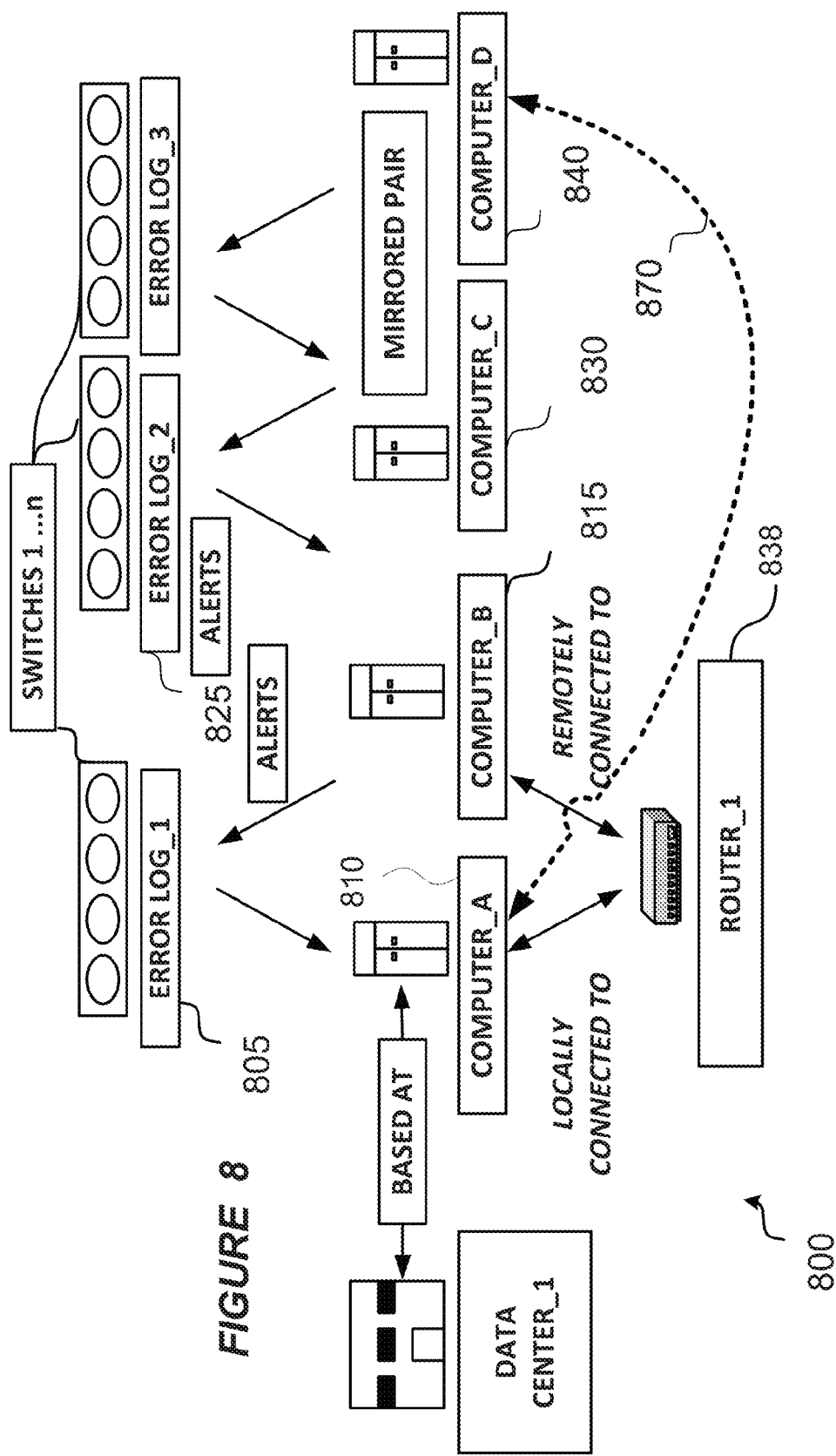
FIG. 8 depicts example instance information of a computer network as mapped into ontological form in accordance with one illustrative embodiment of the present invention.

In an alternative embodiment, the determination system 200 may be used with a computer system 800 of FIG. 8 to make inferences about sources of errors. This can be particularly important in complex systems where an error event in one computer can lead to an "event storm" in other computer systems connected to the same network. The operations 100 are followed. If Computer_B 815 sends an error alert in an electronic message to Computer_A 814, this can be represented in semantically readable ontological form as <<Computer_B 815>><alerts><<Computer_A 810>><with><<Error_log_1 805>>. At operation 160, an alert component 260 of the determination system 200 presents the results to a network analyst 280 with a ranked list of derived links 870 to help prioritize which links to follow up on. The network analyst 280 uses an analysis application 275, such as IBM Tivoli® Netcool®/Omnibus. In the case of a computer network, the links may be in the form of electronic error alerts. The derived link 870 may be in the form of a newly configured error message from the computer that actually suffers an original failure to a management console.

For example, consider that there is a fault in Computer_D 840 and the fault causes alerts to be sent to other computers in the network. The actual source of the fault may not be initially known by a monitoring application 275. The ontology may include the following objects, links, and evidence:

Input objects: <<Computer_A 810>>, <<Computer_B 815>>, <<Computer_C 830>>, <<Computer_D 840>>, <<Router_1 838>>

Links: <alerts> <is locally connected to> <is remotely connected to>

Evidence:
<<Computer_B 815>> <alerts> <<Computer_A 810>>
<<Computer_B 815>> <is remotely connected to> <<Router_1 838>>;
<<Computer_C 830>>, <is connected to> <<Router_1 838>>
<<Computer_C 830>> <alerts> <<Computer_B 815>>
<<Computer_D 840>> <alerts> <<Computer_C 830>>
<<Computer_D 840>> <is mirrored with> <<Computer_C 830>>
<<Router_1 838>> has high Quality of Service Illustrative embodiments use machine learning to analyze features of objects and strengths of the links to conclude that there is a new derived link <is source of error alert to> and that an output pattern can be deduced as follows:

Output: <<Computer_D 840>>, <is source of error alert to > <<Computer_A 810>>.

Those of ordinary skill in the art will recognize that there are numerous types of instance information 220 that can be used. For example:

Communication data (telephone, email, Instant Messaging, Social Media, Blogs)

Financial data (banking logs, investment logs, purchase history)

Event data (sightings, travel logs, geo-location information)

Associative data (social media, electoral roles)

Those of ordinary skill in the art will further recognize that a communication between two people objects can take the form of numerous types of communication, for example, a call, a phone call, a letter, an email, an electronic transaction, an instant message or a social media post.

In an alternative embodiment the learning model uses telephone call characteristics between two objects, including call date, type, direction telephone type and usage, to assign an importance weight to the link. In some illustrative embodiments, the objects, concepts and type of relationship are defined by organizational degrees of separation from a taxonomy and ontology. In some illustrative embodiments, links between objects comprise grammatical terms such as verbs and nouns that designate the links. In still some illustrative embodiments, evidence characteristics comprise place characteristics comprising at least one of type of occupancy, period of occupancy, location, entry and exit patterns.

The illustrative embodiments may be realized in a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example characteristics of a cloud computing environment are as follows:

1) On-demand self-service: a cloud consumer can unilaterally provision computing capabilities, such as server time and network storage, as needed automatically without requiring human interaction with the service's provider.

2) Broad network access: capabilities are available over a network and accessed through standard mechanisms that promote use by heterogeneous thin or thick client platforms (e.g., mobile phones, laptops, and PDAs).

3) Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

4) Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

5) Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Examples of service models in a cloud computing environment include the following:

1) Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

2) Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

3) Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Example deployment models of a cloud computing environment are as follows:
1) Private cloud: the cloud infrastructure is operated solely for an organization. It may be managed by the organization or a third party and may exist on-premises or off-premises.
2) Community cloud: the cloud infrastructure is shared by several organizations and supports a specific community that has shared concerns (e.g., mission, security requirements, policy, and compliance considerations). It may be managed by the organizations or a third party and may exist on-premises or off-premises.
Public cloud: the cloud infrastructure is made available to the general public or a large industry group and is owned by an organization selling cloud services.
3) Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
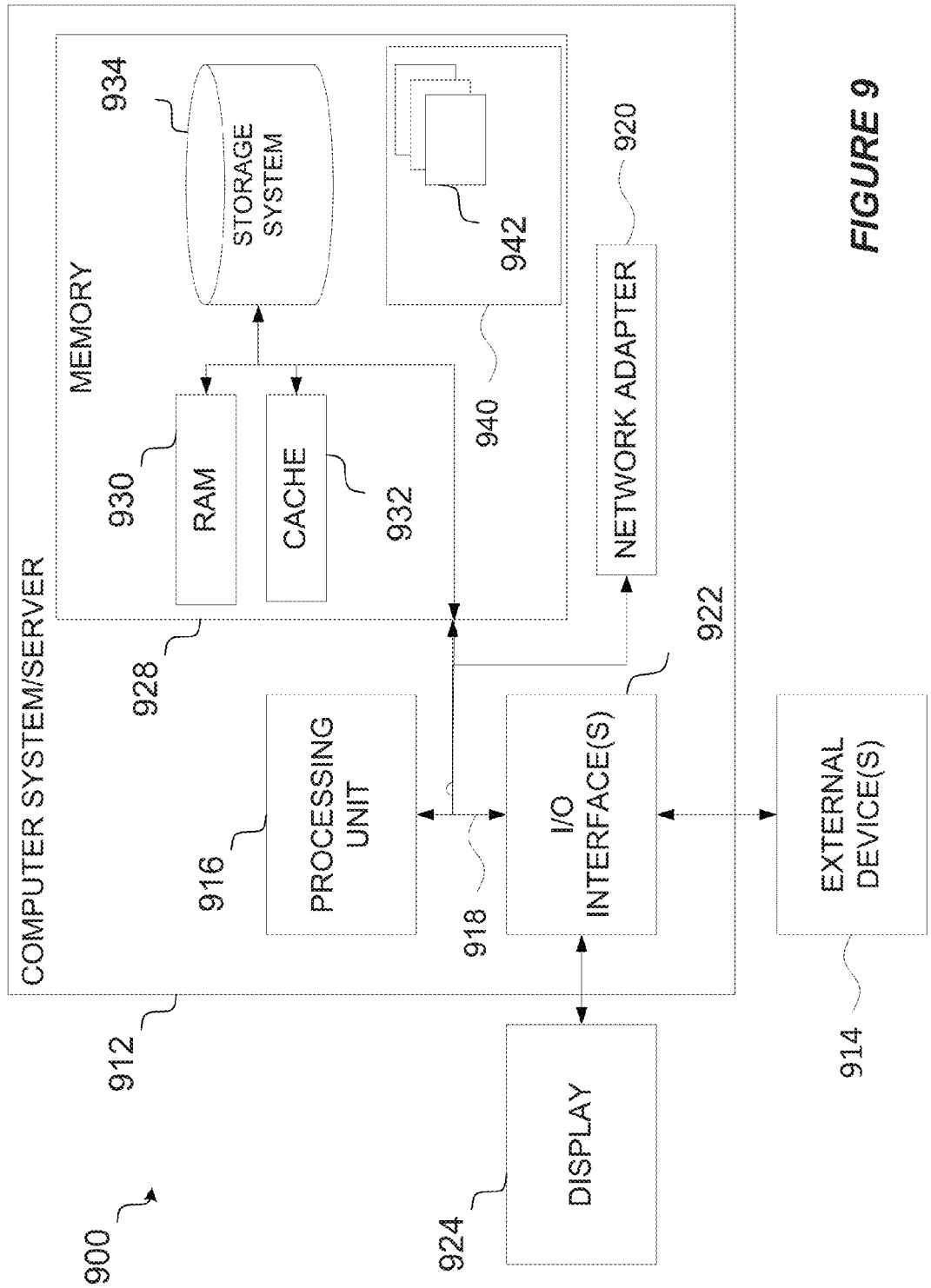
FIG. 9 is an example block diagram depicting a schematic of an example of a cloud computing node in which one illustrative embodiment of the present invention may be implemented.

Referring now to FIG. 9, a schematic of an example of a cloud computing node is shown. Cloud computing node 900 is only one example of a suitable cloud computing node and is not intended to suggest any limitation as to the scope of use or functionality of embodiments of the invention described herein. Regardless, cloud computing node 900 is capable of being implemented and/or performing any of the functionality set forth hereinabove.

In cloud computing node 900 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in cloud computing node 900 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Figure 10:
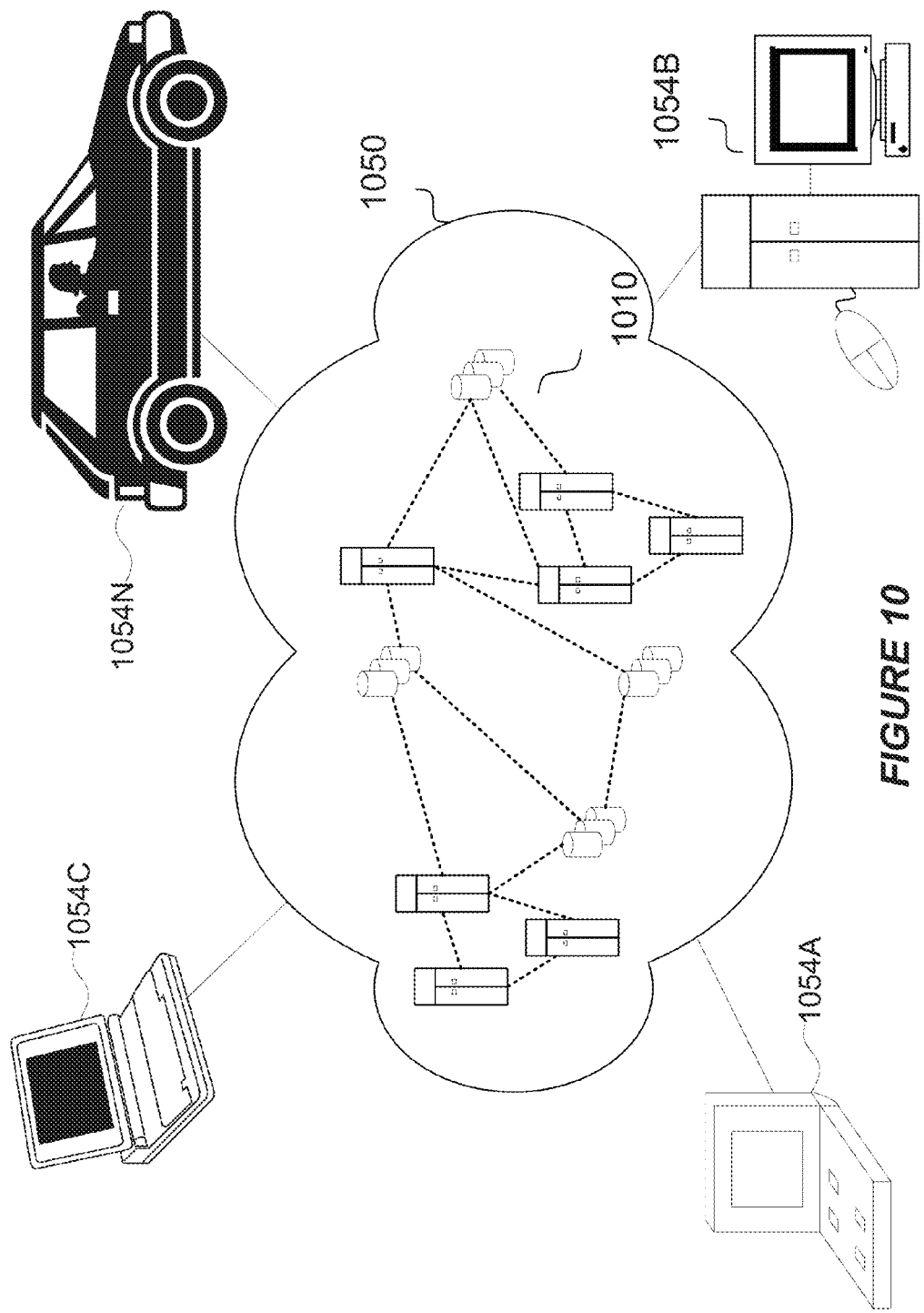
FIG. 10 depicts an illustrative cloud computing environment in which one illustrative embodiment of the present invention may be implemented.

Referring now to FIG. 10, illustrative cloud computing environment 1050 is depicted. As shown, cloud computing environment 1150 comprises one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
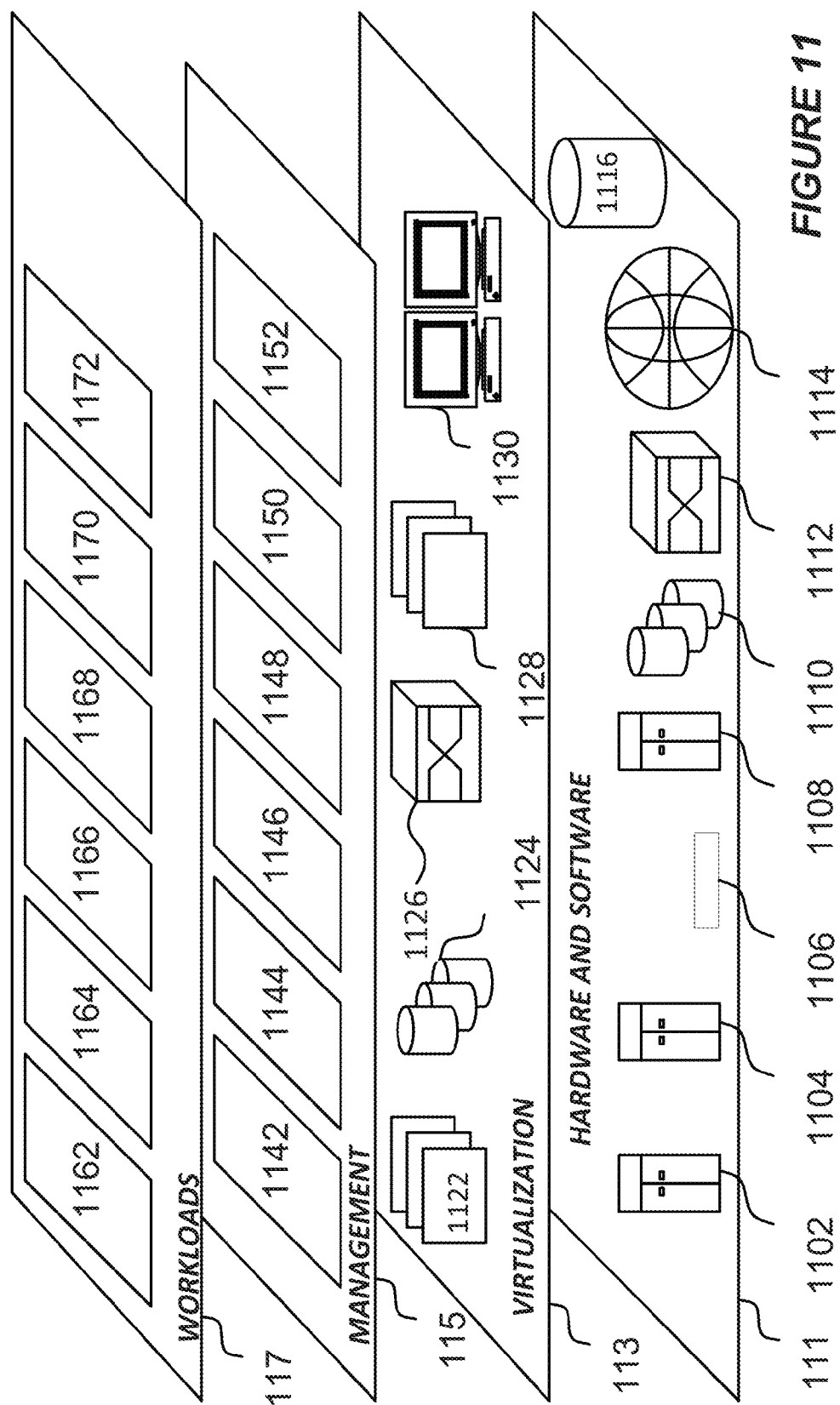
FIG. 11 depicts an example set of functional abstraction layers provided by a cloud computing environment in which one illustrative embodiment of the present invention may be implemented.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided.

Hardware and software layer 111 includes hardware and software components. Examples of hardware components include mainframes 1102, in one example IBM® zSeries® systems; RISC (Reduced Instruction Set Computer) architecture based servers 1104, in one example IBM pSeries® systems; IBM xSeries® systems 1106; IBM BladeCenter® systems 1108; storage devices 1110; networks and networking components 1112. Examples of software components include network application server software 1114, in one example IBM WebSphere® application server software; and database software, in one example IBM DB2® database software 1116. IBM, zSeries, pSeries, xSeries, BladeCenter, i2, Analysts Notebook, Tivoli, Netcool, WebSphere and DB2 are trademarks of International Business Machines Corporation, registered in many jurisdictions worldwide.

Virtualization layer 113 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 115 may provide the functions described below. Resource provisioning 1142 provides dynamic procurement of computing resources and other resources that are utilized to perform tasks within the cloud computing environment. Metering and Pricing 1144 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1146 provides access to the cloud computing environment for consumers and system administrators. Service level management 1148 provides cloud computing resource allocation and management such that required service levels are met. Service Level Agreement (SLA) planning and fulfillment 1150 provide pre-arrangement for, and procurement of, cloud computing resources for which a future requirement is anticipated in accordance with an SLA.

Workloads layer 117 provides examples of functionality for which the cloud computing environment may be utilized. Examples of workloads and functions which may be provided from this layer include: mapping and navigation 1162; software development and lifecycle management 1164; virtual classroom education delivery 1166; data analytics processing 1168; transaction processing 1170; and determination system 200 processing 1172 of one illustrative embodiment of the present invention. Alternatively, determination system 200 processing 1152 can be carried out at the management layer 115.

Figure 12:
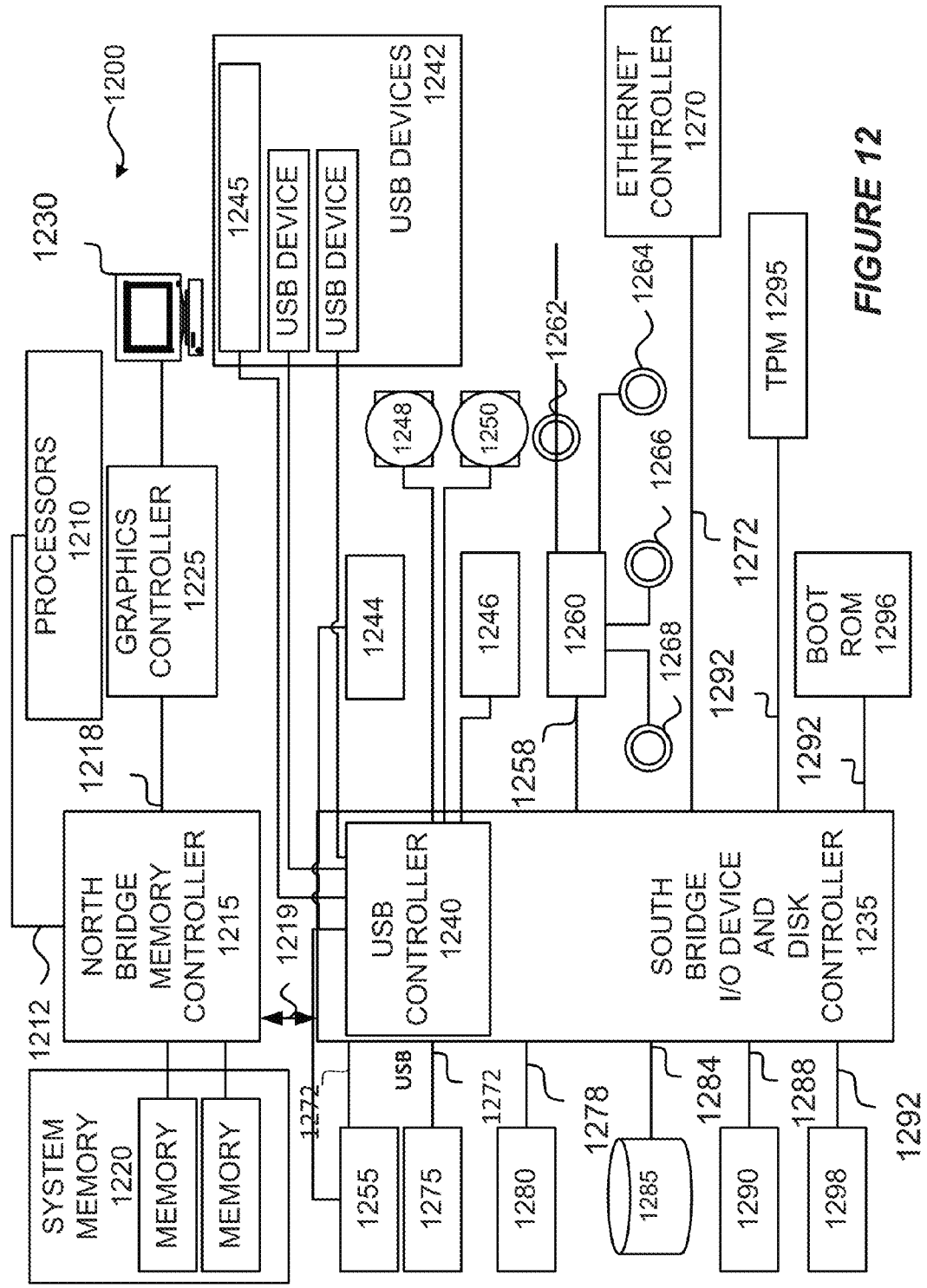
FIG. 12 depicts an example information handling system, which is a simplified example of a computer system capable of performing the computing operations described herein, in which one illustrative embodiment of the present invention may be implemented.

FIG. 12 illustrates an information handling system 1200, which is a simplified example of a computer system capable of performing the computing operations described herein. Information handling system 1200 includes one or more processors 1210 coupled to processor interface bus 1212. Processor interface bus 1212 connects processors 1210 to Northbridge 1215, which is also known as the Memory Controller Hub (MCH). Northbridge 1215 connects to system memory 1220 and provides a means for processor(s) 1210 to access the system memory. Graphics controller 1225 also connects to Northbridge 1215. In one embodiment, PCI Express bus 1218 connects Northbridge 1215 to graphics controller 1225. Graphics controller 1225 connects to display device 1230, such as a computer monitor. Northbridge 1215 and Southbridge 1235 connect to each other using bus 1219. In one embodiment, the bus is a Direct Media Interface (DMI) bus that transfers data at high speeds in each direction between Northbridge 1215 and Southbridge 1235. In another embodiment, a Peripheral Component Interconnect (PCI) bus connects the Northbridge and the Southbridge. Southbridge 1235, also known as the I/O Controller Hub (ICH) is a chip that generally implements capabilities that operate at slower speeds than the capabilities provided by the Northbridge. Southbridge 1235 typically provides various busses used to connect various components. These busses include, for example, PCI and PCI Express busses, an ISA bus, a System Management Bus (SMBus or SMB), and/or a Low Pin Count (LPC) bus 1292. The LPC bus often connects low-bandwidth devices, such as boot ROM 1296 and "legacy" I/O devices (using a "super I/O" chip). The "legacy" I/O devices 1298 can include, for example, serial and parallel ports, keyboard, mouse, and/or a floppy disk controller. The LPC bus also connects Southbridge 1235 to Trusted Platform Module (TPM) 1295. Other components often included in Southbridge 1235 include a Direct Memory Access (DMA) controller, a Programmable Interrupt Controller (PIC), and a storage device controller, which connects Southbridge 1235 to nonvolatile storage device 1285, such as a hard disk drive, using bus 1284.

ExpressCard 1255 is a slot that connects hot-pluggable devices to the information handling system. ExpressCard 1255 supports both PCI Express and USB connectivity as it connects to Southbridge 1235 using both the Universal Serial Bus (USB) the PCI Express bus. Southbridge 1235 includes USB Controller 1240 that provides USB connectivity to devices that connect to the USB. These devices include webcam (camera) 1250, infrared (IR) receiver 1248, keyboard and trackpad 1244, and Bluetooth device 1246, which provides for wireless personal area networks (PANs). USB Controller 1240 also provides USB connectivity to other miscellaneous USB connected devices 1242, such as a mouse, removable nonvolatile storage device 1245, modems, network cards, ISDN connectors, fax, printers, USB hubs, and many other types of USB connected devices. While removable nonvolatile storage device 1245 is shown as a USB-connected device, removable nonvolatile storage device 1245 could be connected using a different interface, such as a Firewire interface, etc.

Wireless Local Area Network (LAN) device 1275 connects to Southbridge 1235 via the PCI or PCI Express bus 1272. LAN device 1275 typically implements one of the IEEE 0.802.11 standards of over-the-air modulation techniques that all use the same protocol to wireless communicate between information handling system 1200 and another computer system or device. Optical storage device 1290 connects to Southbridge 1235 using Serial ATA (SATA) bus 1288. Serial ATA adapters and devices communicate over a high-speed serial link. The Serial ATA bus also connects Southbridge 1235 to other forms of storage devices, such as hard disk drives. Audio circuitry 1260, such as a sound card, connects to Southbridge 1235 via bus 1258. Audio circuitry 1260 also provides functionality such as audio line-in and optical digital audio in port 1262, optical digital output and headphone jack 1264, internal speakers 1266, and internal microphone 1268. Ethernet controller 1270 connects to Southbridge 1235 using a bus, such as the PCI or PCI Express bus. Ethernet controller 1270 connects information handling system 1200 to a computer network, such as a Local Area Network (LAN), the Internet, and other public and private computer networks.

While FIG. 12 shows one information handling system 1200, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 1295) shown in FIG. 12 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 12.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Java and all Java-based trademarks and logos are trademarks or registered trademarks of Oracle and/or its affiliates.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In an alternative embodiment the present invention may be implemented in a computer program (or application) stored in a medium, being connected to hardware to resolve the problem.

For the avoidance of doubt, the term "comprising", as used herein throughout the description and claims is not to be construed as meaning "consisting only of".

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for evaluating links between objects, the computer system comprising:
   one or more processors;
   one or more computer readable storage media;
   program instructions stored on the computer readable storage media and executed by at least one processor of the one or more processors to configure the at least one processor to:
   receive an ontology data structure, the ontology data structure specifying object types and associated semantic feature types, and a set of semantic patterns that each specify a link between at least two of the specified object types;

generate an ontological instance based on the ontology data structure and instance information received from an information source;

identify, from the ontological instance, semantically significant links between at least two objects in the ontological instance;

analyze associated semantic features associated with the at least two objects of the identified semantically significant links to determine a strength measure for each of the identified semantically significant links;

generate at least one derived link based on the strength measures for each of the semantically significant links, wherein the derived link is a new link that previously did not exist in the ontological instance; and update a learning model of the computer system to include the generated at least one derived link, wherein the program instructions further configure the at least one processor to invoke machine learning techniques of a question-answering (QA) system at least by:

identifying a list of entities of interest;

creating one or more questions based on the identified list of entities of interest;

processing the one or more questions using the QA system and a corpus of information to generate one or more answers to the one or more questions;

extracting case information summary entities based on the one or more answers to the one or more questions generated by the QA system; and outputting a list of entities of interest along with the case information summary entities, and identifiers of relationships between the entities of interest and the summary entities.

2. The computer system of claim 1, wherein the program instructions further configure the at least one processor to analyze the associated semantic features associated with the at least two objects of the identified semantically significant links at least by invoking machine learning techniques of a question-answering (QA) system.

3. The computer system of claim 1, wherein the program instructions further configure the at least one processor to analyze the associated semantic features associated with the at least two objects of the identified semantically significant links at least by analyzing the associated semantic features with a learning model to determine weightings for the semantically significant links, and wherein the learning model comprises a set of relative levels for occurrences of data instances based on a domain of the ontology data structure and a set of relative levels associated with the associated semantic features.

4. The computer system of claim 3, wherein the program instructions further configure the at least one processor to update the learning model at least by updating the learning model to include the weightings for each of the identified semantically significant links.

5. The computer system of claim 3, wherein the learning model uses communications data between two objects, including at least one of a telephone call, email, Instant Messaging, social media post, or weblog, to determine the weighting associated with a semantically significant link.

6. The computer system of claim 3, wherein the learning model uses financial data transaction data, including at least one of banking logs, investment logs, or purchase history, to determine the weighting associated with a semantically significant link.

7. The computer system of claim 3, wherein the learning model uses event data, including at least one of sightings, travel logs, geo-location, or place characteristics, to determine the weighting associated with a semantically significant link, the place characteristics comprising at least one of a type of occupancy, period of occupancy, location, or entry and exit patterns.

8. The computer system of claim 3, wherein the learning model uses associative data, at least one of social media or electoral roles, to determine the weighting associated with a semantically significant link.

9. The computer system of claim 1, wherein the instance information comprises at least one of structured information, unstructured information, and relational source information.

10. The computer system of claim 1, wherein the program instructions further configure the at least one processor to generate and output an alert notification based on the generation of the at least one derived link, and wherein the alert notification identifies the at least one derived link and determined weightings associated with the at least one derived link as a ranked list.

11. The computer system of claim 1, wherein the program instructions configure the at least one processor to generate and output an alert notification in response to detecting that one or more determined strength measures of the semantically significant links has reached a predetermined threshold, and wherein the alert notification identifies the semantically significant links and the determined strength measures that have reached the predetermined threshold.

12. A computer program product for bidirectional hyperlink management of a hypertext associated with an on-line media, the computer program product comprising:

a non-transitory computer-readable tangible storage medium and program instructions stored thereon, the program instructions when executed by a processor, cause the processor to be configured to:

receive an ontology data structure, the ontology data structure comprising object types and associated semantic feature types, and a set or semantic patterns that each specify a link between at least two of the object types;

generate an ontological instance based on the ontology data structure and instance information from an information source;

identify, from the ontological instance, semantically significant links between at least two objects in the ontological instance;

analyze associated semantic features associated with the at least two objects of the identified semantically significant links to determine a strength measure for each of the identified semantically significant links;

generate at least one derived link based on the strength measure for each of the semantically significant links, wherein the derived link is a new link that previously did not exist in the ontological instance; and update a learning model to include the generated at least one derived link, wherein the program instructions further cause the processor to invoke machine learning techniques of a question-answering (QA) system at least by:

identifying a list of entities of interest;

creating one or more questions based on the identified list of entities of interest;

processing the one or more questions using the QA system and a corpus of information to generate one or more answers to the one or more questions;

extracting case information summary entities based on the one or more answers to the one or more questions generated by the QA system; and outputting a list of entities of interest along with the case information summary entities, and identifiers of relationships between the entities of interest and the summary entities.

13. A computer system for evaluating links between objects, the computer system comprising:
one or more processors;
one or more computer readable storage media;
program instructions stored on the computer readable storage media and executed by at least one processor of the one or more processors to configure the at least one processor to:
receive an ontology data structure, the ontology data structure specifying object types and associated semantic feature types, and a set of semantic patterns that each specify a link between at least two of the specified object types;
generate an ontological instance based on the ontology data structure and instance information received from an information source;
identify, from the ontological instance, semantically significant links between at least two objects in the ontological instance;
analyze associated semantic features associated with the at least two objects of the identified semantically significant links to determine a strength measure for each of the identified semantically significant links;
generate at least one derived link based on the strength measures for each of the semantically significant links, wherein the derived link is a new link that previously did not exist in the ontological instance; and
update a learning model of the computer system to include the generated at least one derived link, wherein:
the ontological instance comprises objects representing computing devices in a distributed computing system,
identified semantically significant links comprise connections between computing devices in the distributed computing system, and
the derived link represents a source of an error in the distributed computing system.

14. The computer system of claim 13, wherein the program instructions further cause the processor to analyze the associated semantic features associated with the at least two objects of the identified semantically significant links at least by invoking machine learning techniques of a question-answering (QA) system.

15. The computer system of claim 13, wherein the program instructions further configure the at least one processor to analyze the associated semantic features associated with the at least two objects of the identified semantically significant links at least by analyzing the associated semantic features with a learning model to determine weightings for the semantically significant links, and wherein the learning model comprises a set of relative levels for occurrences of data instances based on a domain of the ontology data structure and a set of relative levels associated with the associated semantic features.

16. The computer system of claim 15, wherein the program instructions further configure the at least one processor to update the learning model at least by updating the learning model to include the weightings for each of the identified semantically significant links.

17. The computer system of claim 15, wherein the learning model uses communications data between two objects, including at least one of a telephone call, email, Instant Messaging, social media post, or weblog, to determine the weighting associated with a semantically significant link.

18. The computer system of claim 15, wherein the learning model uses financial data transaction data, including at least one of banking logs, investment logs, or purchase history, to determine the weighting associated with a semantically significant link.

19. The computer system of claim 15, wherein the learning model uses event data, including at least one of sightings, travel logs, geo-location, or place characteristics, to determine the weighting associated with a semantically significant link, the place characteristics comprising at least one of a type of occupancy, period of occupancy, location, or entry and exit patterns.

20. The computer system of claim 15, wherein the learning model uses associative data, at least one of social media or electoral roles, to determine the weighting associated with a semantically significant link.

21. The computer system of claim 13, wherein the instance information comprises at least one of structured information, unstructured information, and relational source information.

22. The computer system of claim 13, wherein the program instructions further configure the at least one processor to generate and output an alert notification based on the generation of the at least one derived link, and wherein the alert-notification identifies the at least one derived link and determined weightings associated with the at least one derived link as a ranked list.

23. The computer system of claim 13, wherein the program instructions configure the at least one processor to generate and output an alert notification in response to detecting that one or more determined strength measures of the semantically significant links has reached a predetermined threshold, and wherein the alert notification identifies the semantically significant links and the determined strength measures that have reached the predetermined threshold.

24. A computer program product for bidirectional hyperlink management of a hypertext associated with an on-line media, the computer program product comprising:
a non-transitory computer-readable tangible storage medium and program instructions stored thereon, the program instructions when executed by a processor, cause the processor to be configured to:
receive an ontology data structure, the ontology data structure comprising object types and associated semantic feature types, and a set of semantic patterns that each specify a link between at least two of the object types;
generate an ontological instance based on the ontology data structure and instance information from an information source;
identify, from the ontological instance, semantically significant links between at least two objects in the ontological instance;
analyze associated semantic features associated with the at least two objects of the identified semantically significant links to determine a strength measure for each of the identified semantically significant links;
generate at least one derived link based on the strength measure for each of the semantically significant links, wherein the derived link is a new link that previously did not exist in the ontological instance; and
update a learning model to include the generated at least one derived link, wherein:
the ontological instance comprises objects representing computing devices in a distributed computing system, identified semantically significant links comprise connections between computing devices in the distributed computing system, and the derived link represents a source of an error in the distributed computing system.

\* \* \* \* \*